(12) United States Patent
Chiba

(10) Patent No.: US 7,229,276 B2
(45) Date of Patent: Jun. 12, 2007

(54) APPARATUS FOR MANUFACTURING OUTER TUBE OF INJECTOR

(75) Inventor: Atsushi Chiba, Tokyo (JP)

(73) Assignee: Kabushiki Kaisha Top, Tokyo (JP)

( * ) Notice: Subject to any disclaimer, the term of this patent is extended or adjusted under 35 U.S.C. 154(b) by 0 days.

(21) Appl. No.: 11/514,847

(22) Filed: Sep. 5, 2006

(65) Prior Publication Data

US 2007/0003662 A1    Jan. 4, 2007

Related U.S. Application Data

(62) Division of application No. 10/482,478, filed as application No. PCT/JP02/05833 on Jun. 12, 2002, now abandoned.

(30) Foreign Application Priority Data

Jul. 3, 2001    (JP)    ............................. 2001-202525

(51) Int. Cl.
B29C 45/27    (2006.01)
(52) U.S. Cl. ...................... 425/555; 264/334; 425/556; 425/572; 425/573; 425/577; 425/588
(58) Field of Classification Search ................ 425/572, 425/588, 573, 577, 556, 555; 264/334
See application file for complete search history.

(56) References Cited

U.S. PATENT DOCUMENTS

| | | | |
|---|---|---|---|
| 2,624,071 A | | 1/1953 | Strahm et al. |
| 2,799,435 A | * | 7/1957 | Abplanalp ............... 264/328.8 |
| 4,509,907 A | | 4/1985 | Ratheiser et al. |
| 4,664,854 A | * | 5/1987 | Bakalar ....................... 425/555 |
| 4,942,010 A | | 7/1990 | Baker |
| 5,119,866 A | * | 6/1992 | Mihara ........................ 425/555 |
| 5,759,647 A | | 6/1998 | Kuroda et al. |
| 5,814,358 A | | 9/1998 | Bock et al. |
| 6,164,953 A | * | 12/2000 | Winget ........................ 425/577 |

FOREIGN PATENT DOCUMENTS

| | | |
|---|---|---|
| EP | 384 657 | 8/1990 |
| JP | 02-036882 | 2/1990 |
| JP | 09-094851 | 4/1997 |
| JP | 09-099076 | 4/1997 |
| JP | 11-164887 | 6/1999 |

* cited by examiner

*Primary Examiner*—Tim Heitbrink
(74) *Attorney, Agent, or Firm*—Birch, Stewart, Kolasch, and Birch, LLP

(57) ABSTRACT

The present invention provides a manufacturing method for manufacturing an outer tube of an injector having a barrel portion having an excellent circularity, while preventing generation of distortion or warp. A molten resin is injected into a cavity 17 of a metal mold 11 including: a fixed mold 13 having a hole portion 12 having a shape along the outer shape of the injector outer tube 1; a movable mold 14 closing the hole portion 12; and a core 15 inserted into the hole portion 12. A cylindrical vacant portion is provided communicating with a flange forming portion 20 of the hole portion 12. The molten resin R is injected from a sprue 22 and a runner 23 via a submarine gate 24 into the cylindrical vacant portion 21 and the molten resin R is introduced into the cavity 17. The cylindrical vacant portion 21 has a push pin 25. When the molten resin has become half-molten state, the resin in the cylindrical vacant portion is introduced with pressure into the cavity 17 by the push pin 25. When the amount of the molten resin R in the cavity 17 is insufficient, a wait position of the push pin is moved in a direction apart from the connection portion of the submarine gate 24, so as to inject the molten resin R and supplement the insufficient resin in the cavity 17.

5 Claims, 7 Drawing Sheets

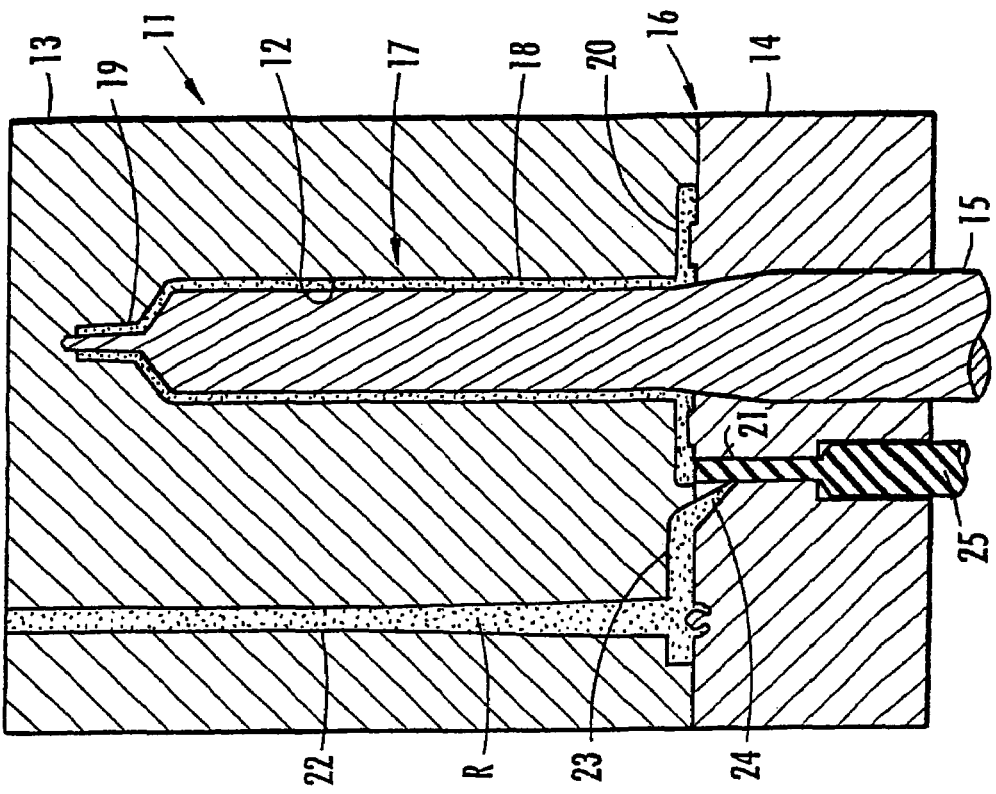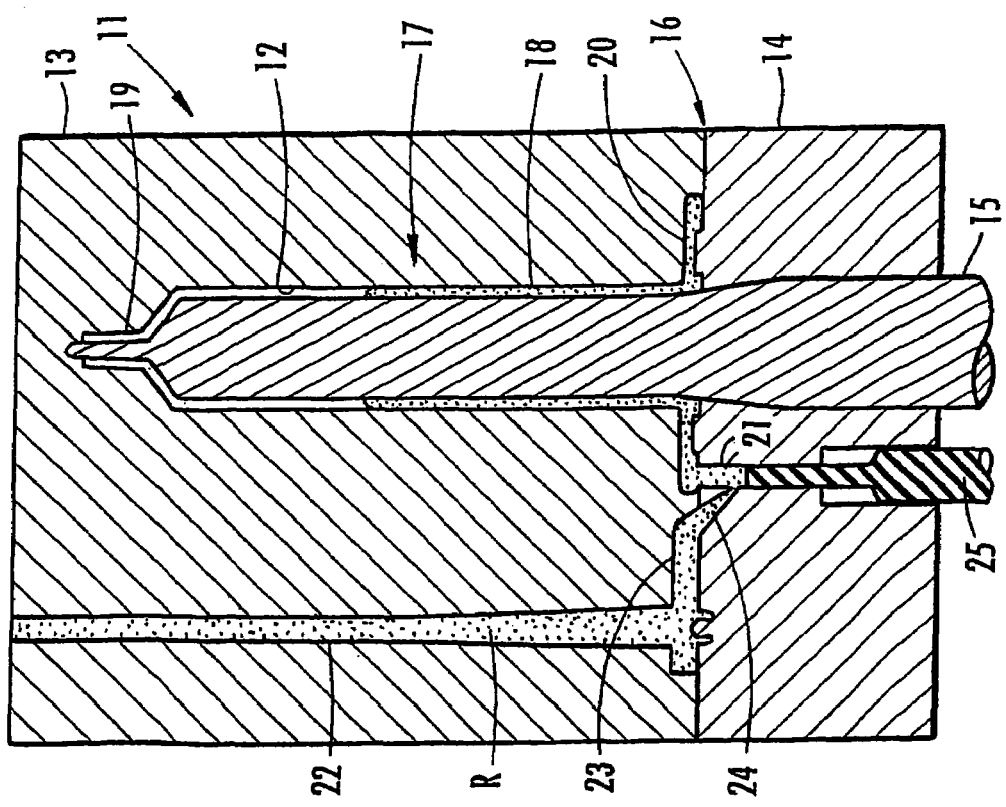

APPARATUS FOR MANUFACTURING OUTER TUBE OF INJECTOR

This application is a Divisional of application Ser. No. 10/482,478 filed Dec. 31, 2003, now abandoned and for which priority is claimed under 35 U.S.C. § 120. Application Ser. No. 10/482,478 is the national phase under 35 U.S.C. § 371 of PCT International Application No. PCT/JP02/05833, which has an International filing date of Jun. 12, 2002, which designated the United States of America.

TECHNICAL FIELD

The present invention relates to an apparatus for manufacturing an outer tube of an injector made from a synthetic resin.

BACKGROUND ART

Conventionally, there are known disposable injector outer tubes produced by injection molding of a synthetic resin such as polypropylene, polycarbonate, and polymethylpentene (TPX). These synthetic resins are inactive for a medicine liquid. The polycarbonate and TPX have an advantage that they can be sterilized by a high-pressure vapor and have a high transparency.

As shown in FIG. 1, the injector outer tube 1 has a barrel portion 2, a lure-tapered portion 3 arranged at a front end of the barrel portion 2, and a flange portion at a rear end of the barrel portion 2 for holding by fingers. The injector outer tube 1 is normally produced by injection molding by using a metal mold 11 consisting of a fixed mold 13, a movable mold 14, and a core pin (core) 15.

The fixed mold 13 has a hole portion 12 having a shape of the outer shape of the injector outer tube 1. The hole portion 12 is provided vertically on a parting line 16 with the movable mold 14. Moreover, the core pin 15 is adapted to pierce the movable mold 14 to be inserted into the hole portion 12. Furthermore, a molten resin is injected into a cavity 17 formed by the hole portion 12, the movable mold 14, and the core pin 15. The cavity 17 consists of a barrel forming portion 18 and a lure-taper forming portion 19 formed by the core pin 15 inserted into the hole 12 and a flange forming portion 20 formed between the hole portion 12 and the movable mold 14.

It should be noted that in the metal mold 11, the fixed mold 13 has a sprue, a runner, and a gate (not depicted) for guiding a molten resin to the cavity 17.

Injection of a molten resin into the cavity 17 is performed as follows, for example. As shown in FIG. 7A, a plurality (three in the figure) of chip gates 31 are arranged at the front end of the barrel forming portion 18; as shown in FIG. 7B, a plurality (two in the figure) of chip gates 31 are arranged at the base of the lure-taper forming portion 19; or as shown in FIG. 7C, a plurality (two in the figure) of pin point gates 31 are arranged at the front end of the barrel forming portion 18. It should be noted in FIG. 7A to FIG. 7C, for explanation, the barrel forming portion 18, the lure-taper forming portion 19, the runner 23, and the gate 31 arranged inside the fixed mold are exposed.

By using the method of FIG. 7A to FIG. 7C, it is possible to obtain a metal molded product without performing cutting the gate 31 after injection of the molten resin.

However, when the methods of FIG. 7A to FIG. 7C are used, the resin is supplied from the front end side of the core pin 14 into the cavity 17 under a high pressure and accordingly, there is a problem that the core pin 15 is inclined, making the thickness of the barrel portion 2 uneven. Moreover, when the resin portions injected from the plurality of gates 31 join in the cavity 17, a distortion may be caused, deteriorating the circularity of the cross section of the barrel portion 2.

Instead of the methods of FIG. 7A to FIG. 7C, there is also a method to provide only one gate 31 at the rear end side of the barrel forming portion 18 as shown in FIG. 8. According to the method of FIG. 7, there is no confluence of the injected resin in the cavity 17, and hence it is possible to prevent the aforementioned distortion.

However, in the method of FIG. 8, when the resin filled in the cavity proceeds along the core pin 15, the flow front F of the resin proceeds earlier at the side where the gate 31 is provided and the flow front F is delayed at the opposite side of the gate 31. For this, as shown in FIG. 9, in the injector outer tube 1 obtained by the method of FIG. 8, the barrel portion 2 has a thicker wall at the side where the gate 31 is provided, which deteriorates the circularity of the cross section of the barrel portion and warp is caused.

Moreover, the injector outer tube 1 is used in combination with a plunger (not depicted) sliding along the inner wall of the barrel portion 2. When the plunger has a gasket made from a thermoplastic elastomer, if the circularity is low, the gasket is creep-deformed, causing a problem that a liquid may leak when the injector is used.

DISCLOSURE OF THE INVENTION

It is therefore an object of the present invention to provide a manufacturing method of an outer tube of an injector capable of manufacturing an outer tube of an injector having a barrel portion of uniform thickness and an excellent circularity and preventing generation of distortion or warp.

In order to achieve the aforementioned object, the present invention provides a manufacturing method of an outer tube of an injector comprising the step of molding an outer tube of an injector by injecting a molten resin into a cavity defined by a metal mold comprising: a fixed mold having a hole portion having a shape along an outer shape of the injector outer tube consisting of a barrel portion, a taper portion arranged at a front end of the barrel where an injection needle is mounted, and a flange portion arranged at a rear end of the barrel, the fixed mold being provided vertical to a parting line defined by a rear end of the flange portion forming portion; a movable mold for closing the hole portion along the parting line; and a core piercing the movable mold and inserted into the hole portion, wherein the fixed mold includes a sprue for guiding the molten resin and a runner branching from the sprue; the movable mold includes a cylindrical vacant portion arranged vertical to the parting line and communicating with a portion where the flange portion is formed, and a submarine gate communicating with the runner and connected to an intermediate portion of the cylindrical vacant portion; and the molten resin is injected from the sprue via the runner and the submarine gate into the cylindrical vacant portion and introduced via the cylindrical vacant portion into the cavity.

According to the manufacturing method of the present invention, a cavity having a shape of the injector outer tube is formed by the hole portion of the fixed mold, the movable mold closing the hole portion, and the core piercing the movable mold and is inserted into the hole portion. The cavity has a space between the hole portion and the core for forming a barrel portion of the injector outer tube and a portion for forming a barrel front end portion at the front end of the barrel portion. Moreover, the cavity has a portion between the hole portion of the rear end of the barrel portion and the movable mold for forming a the flange portion. The portion for forming the flange portion communicates with the cylindrical vacant portion arranged in the movable mold.

When a molten resin is injected from the sprue via the runner and the submarine gate, the molten resin is firstly injected into the cylindrical vacant portion and then introduced from the cylindrical vacant portion into the portion for forming the flange portion. After filling the portion for forming the flange portion, the molten resin is introduced into a portion for forming the injector outer tube and flows from the portion for forming the flange portion into the portion for forming the barrel front end portion.

As has been described above, the molten resin is introduced into the barrel portion for forming the injector outer tube after filling the portion for forming the flange portion and accordingly, the flow front of the resin flows uniformly along the circumferential direction of the barrel portion. This makes a uniform wall thickness of the barrel portion and prevents generation of warping.

Moreover, since the molten resin is introduced into the cavity only from the cylindrical vacant portion, there is no confluence with the molten resin introduced from the other portion. Thus, it is possible to prevent generation of distortion caused by confluence.

Moreover, the manufacturing method according the present invention is characterized in that the metal mold includes a push pin provided slidably along an inner wall of the cylindrical vacant portion and having a tip end which can proceed up to the parting line; the molten resin is injected when the push pin is waiting at a predetermined wait position which is at opposite side of the fixed mold with respect to a connection portion of the submarine gate; and when the molten resin has become half-molten state, the push pin is made to proceed up to the parting line so as to introduce the molten resin with pressure from the cylindrical vacant portion into the cavity.

According to the manufacturing method of the present invention, when the molten resin has become half-molten state, the push pin is made to proceed up to the parting line and the resin is introduced with pressure from the cylindrical vacant portion into the cavity. Accordingly, when removing the metal molded injector outer tube from the metal mold, there is no case that the flange portion is connected to a resin solidified in the cylindrical vacant portion. This can eliminate the process of cutting a resin solidified in the cylindrical vacant portion. Moreover, it is possible to make smooth the portion where the flange is connected to the cylindrical vacant portion.

Moreover, by introducing with pressure the resin from the cylindrical vacant portion into the cavity, it is possible to supplement the resin amount filled in the cavity, which in turn prevents generation of a vacant portion in the resin. Thus, it is possible to obtain an outer tube of an injector of a complete shape.

It should be noted that the timing to advance the push pin may be any time after the molten resin is injected and before the resin is solidified.

Moreover, there is a metal mold that the molten resin filled in the cavity is always insufficient regardless of the injection condition. In such a case, conventionally, the sprue and the runner are cut off to increase the path of the molten resin, thereby solving the problem of insufficient molten resin. However, when the cutting off is too much, it is difficult to repair again and the metal mold itself should be abandoned as a defective product.

In the manufacturing method of the present invention, when the molten resin has become insufficient in the cavity even after the resin in the cylindrical vacant portion is introduced with pressure into the cavity using the push pin, the wait position of the push pin is modified in a direction apart from the connection portion of the submarine gate, so as to inject the molten resin, thereby compensating the insufficient resin in the cavity. Modification of the wait position of the push pin may be performed by mechanically retreating the push pin in a direction apart from the connection portion of the submarine gate or by cutting off the tip end of the push pin.

Accordingly, there is no need of repairing the sprue and the runner by cutting, and it is possible to easily repair the metal mold causing insufficiency of the molten resin to be filled. And this can prevent a case that the metal mold itself is abandoned as a defective product. It should be noted that when cutting off the tip end of the push pin, even if the cutting off results in an excessive amount, the push pin alone need be abandoned as a defective product. As compared to the case that the entire metal mold is abandoned as a defective product, the loss is small even if the repair fails.

Moreover, the manufacturing method according the present invention may be such that the metal mold has: a plurality of hole portions provided in the fixed mold; a plurality of cylindrical vacant portions provided in the movable mold closing the respective hole portions along the parting line and communicating with portions where the flange portions of the respective hole portions are formed; and a plurality of cavities defined by the cores piercing the movable molds and are introduced into the respective hole portions, the fixed mold has a sprue for guiding the molten resin and a plurality of runners branching from the sprue, the movable mold has a plurality of submarine gates communicating with the respective runners and connected to an intermediate portion of the respective cylindrical vacant portions, and the molten resin is injected from the sprue via the runners and the submarine gates into the respective cylindrical vacant portions and via the cylindrical vacant portions into the respective cavities. According to the aforementioned mold, a plurality of injector outer tubes of injectors can be simultaneously obtained by injecting a molten resin from the sprue via the respective runners and submarine gates into the respective cylindrical vacant portions.

When simultaneously producing a plurality of injector outer tubes, the molten resin amount may be insufficient in a particular cavity among the plurality of cavities. In this case, according to the manufacturing method of the present invention, for the cavity causing an insufficient molten resin amount, as has been described above, the wait position of the push pin is changed in a direction apart from the connection portion of the submarine gate so as to inject the molten resin and to thereby supplement the insufficient resin in the cavity.

In the manufacturing method according to the present invention, the molten resin may be one selected from a group consisting of polypropylene, polycarbonate, and polymethylpentene.

BRIEF DESCRIPTION OF THE DRAWINGS

FIG. 2 is a cross sectional view explaining an example of the manufacturing method of the present invention.

BEST MODE FOR CARRYING OUT THE INVENTION

Figure 1:
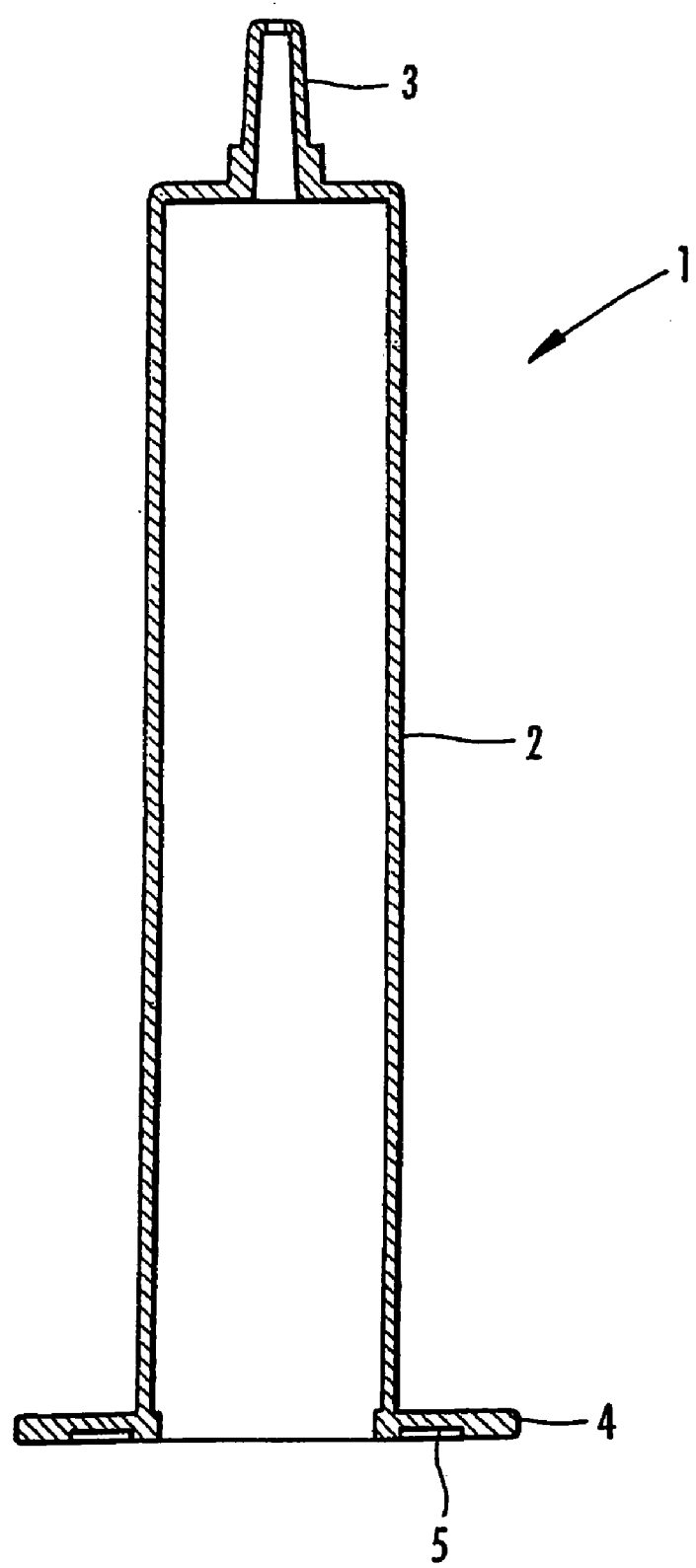
FIG. 1 is a perspective view showing a configuration example of an outer tube of an injector obtained by the manufacturing method of the present invention.

The present embodiment is for manufacturing an injector outer tube 1 shown in FIG. 1. The injector outer tube 1 is made from, for example, polypropylene and has a lure-taper portion 3 at the front end of a cylinder-shaped barrel portion 2 where a injection needle is mounted and a flange portion 4 at the rear end of the barrel portion 2 for holding by fingers. The flange portion 4 has an elliptical shape having a concave portion 5 made by taking out meat on the surface opposite to the barrel portion 2 and an injection trace (not depicted).

In this embodiment, the injector outer tube 1 is produced by using a metal mold 11 shown in FIG. 2A. The metal mold 11 consists of a fixed mold 13 having a hole portion 12 having a shape along the outer shape of the injector outer tube 1, a movable mold 14 for closing the hole 12, and a core pin (core) 15 to be inserted through the movable mold 14 into the hole portion 12. The hole portion 12 is provided vertical to a parting line 16 and the movable mold 114 is arranged so as to close the hole portion 12 along the parting line 16.

By the metal mold 11, the hole portion 12, the movable mold 14, and the core pin 15 constitute a cavity 17 having the shape of the injector outer tube 1. The cavity 17 has a barrel forming portion 18 between the hole portion 12 and the core pin 15 and has a lure-taper forming portion 19 at the front end of the barrel forming portion 18 and a flange forming portion 20 at the rear end of the barrel forming portion 18. The barrel forming portion 18, the lure-taper forming portion 19, and the flange forming portion 20 correspond to the barrel portion 2, the lure-taper portion 3, and the flange portion 4 shown in FIG. 1, respectively.

Moreover, the movable mold 14 has a cylindrical vacant portion 21 communicating with the flange forming portion 20 and a submarine gate 24 connected to an intermediate portion of the cylindrical vacant portion 21. The cylindrical vacant portion 21 is provided vertical to the parting line 16 and has a push pin 25 to introduce with pressure the resin filled inside into the cavity 17. The push pin 25 waits at a predetermined wait position in the cylindrical vacant portion 21 opposite to the fixed mold with respect to the connection portion of the submarine gate 24.

Moreover, the fixed mold 13 has a sprue 22 for guiding the molten resin injected from an injection apparatus (not depicted) and a runner 23 branching from the sprue 22. The runner 23 communicates with the submarine gate 24. The submarine gate 24 extend below the connection portion with the runner 23 by 45 degrees and is connected to the intermediate portion of the cylindrical vacant portion 21.

When producing the injector outer tube 1 by using the metal mold 11, firstly, the hole portion 12 of the fixed mold 13 is closed by the movable mold 14 and the core pin 15 is inserted into the hole portion 12, thereby forming the aforementioned cavity 17.

Next, a molten resin R injected from an injection apparatus (not depicted) is introduced via the sprue 22, the runner 23, and the submarine gate 24 into the cylindrical vacant portion 21. The molten resin R introduced into the cylindrical vacant portion 21 is then introduced into the flange forming portion 20 and after filling the flange forming portion 20, flows into the barrel forming portion 18.

Figure 3:
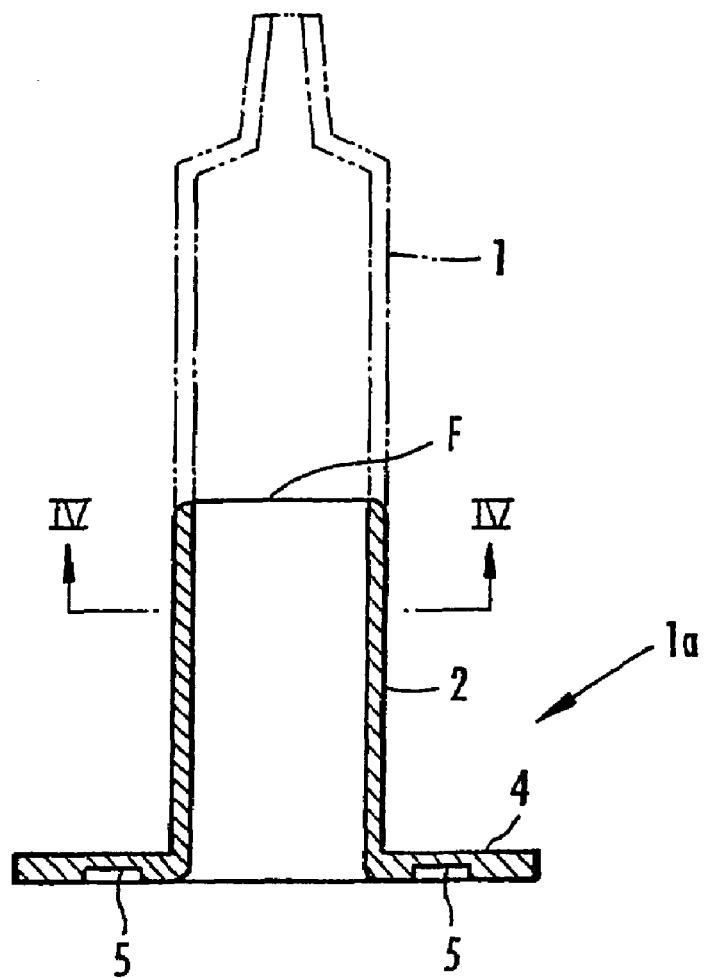
FIG. 3 is a cross sectional view explaining a partially molded product of the injector outer tube obtained by the manufacturing method of the present invention.
Figure 4:
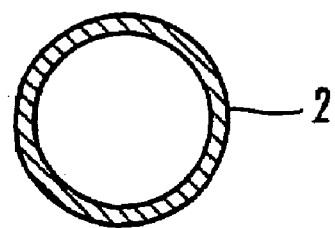
FIG. 4 is a cross sectional view about IV—IV of FIG. 3.

The molten resin R is introduced into the barrel forming portion 18 after filling the flange forming portion. Accordingly, like a partially molded product 1a of the injector outer tube 1 shown in FIG. 3, the flow front F can be formed almost uniformly along the circumference of the barrel forming portion 18. It should be noted that the partially molded product 1a of FIG. 3 is formed by intentionally reducing the amount of the molten resin R introduced into the cavity 17 in the metal mold 11 shown in FIG. 2A. As a result, as shown in FIG. 4, the barrel portion 2 has almost uniform wall thickness along the circumference of the barrel portion 2.

Here, it is preferable that the cylindrical vacant portion 21 do not interfere with the core pint 1, so that the molten resin R is uniformly introduced into the barrel forming portion 18. For this, the cylindrical vacant portion 21 is arranged so as to communicate with the flange forming portion 20 at a position as far as possible from the barrel forming portion 18.

When the cavity 17 and the cylindrical vacant portion 21 are filled with the molten resin R as has been described above and the molten resin R is solidified, a boss is formed on the surface of the flange portion 4 opposite to the barrel portion 2 by the molten resin R filled in the cylindrical vacant portion 21 by the molten resin R filled in the cylindrical vacant portion 21. The flange portion 4 is used for holding by fingers when sliding a plunger (not depicted) along the inner wall of the injector outer tube 1 and presence of the boss hinders the operation.

To cope with this, the boss can be cut off when the metal molded injector outer tube is removed from the metal mold. However, according to the present embodiment, when the molten resin R has become half-molten state, as shown in FIG. 2B, the push pin 25 provided in the cylindrical vacant portion 21 and is normally waiting at the aforementioned wait position is made to proceed toward the fixed mold 13 until it reaches the parting line 16. This makes the resin in the cylindrical vacant portion 21 be introduced with pressure into the cavity 17. In the injector outer tube 1 thus molded, only an injection trace (not depicted) remains on the surface of the flange portion 4 opposite to the barrel portion 2 and the aforementioned boss is not formed, thereby obtaining a smooth surface. Moreover, when the push pin 25 is made to proceed so as to introduce with pressure the resin from the cylindrical vacant portion 21 into the cavity 17, it is possible to obtain an effect to prevent formation of a vacant portion due to the insufficient resin.

Figure 5:
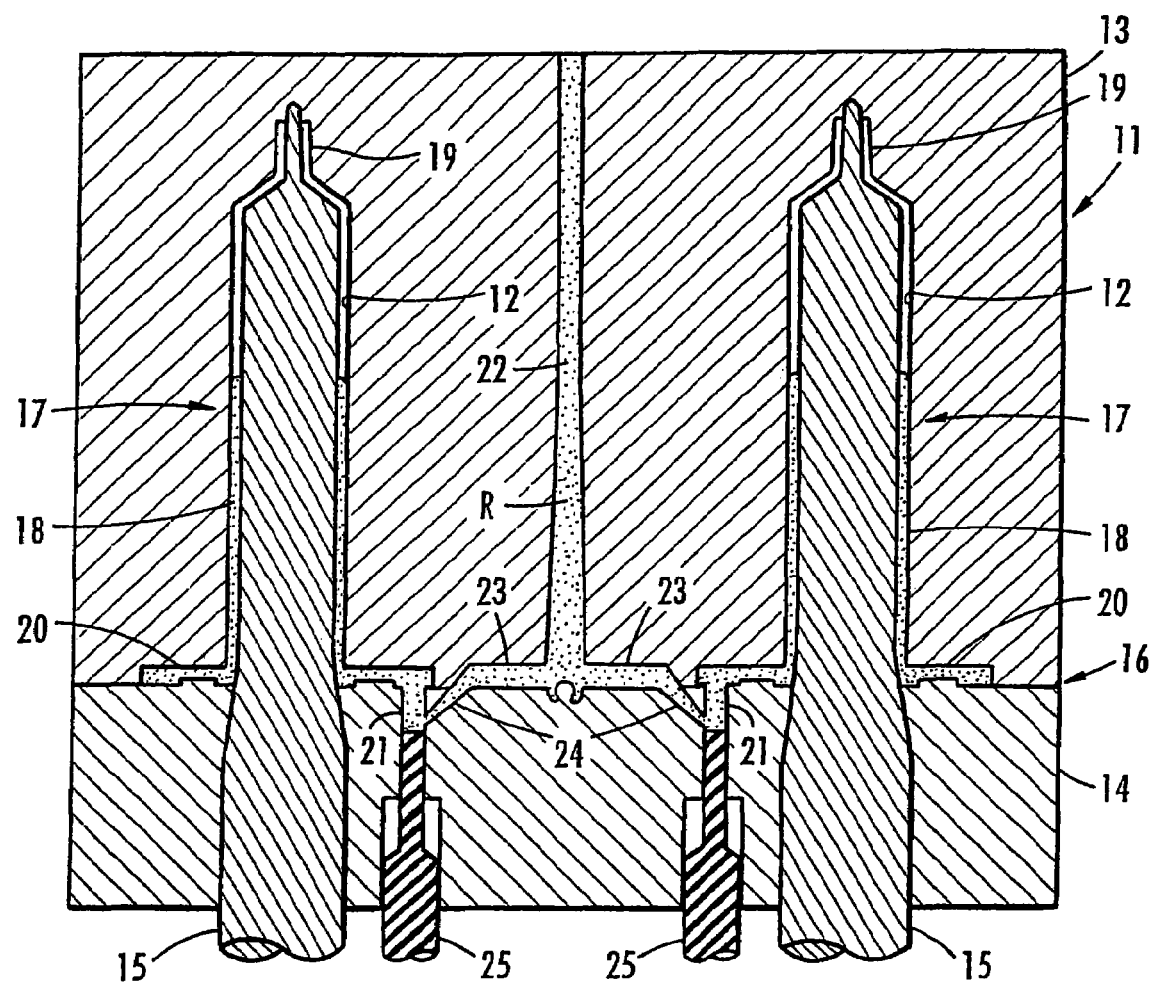
FIG. 5 is a cross sectional view explaining an example of the manufacturing method of the present invention.
Figure 6:
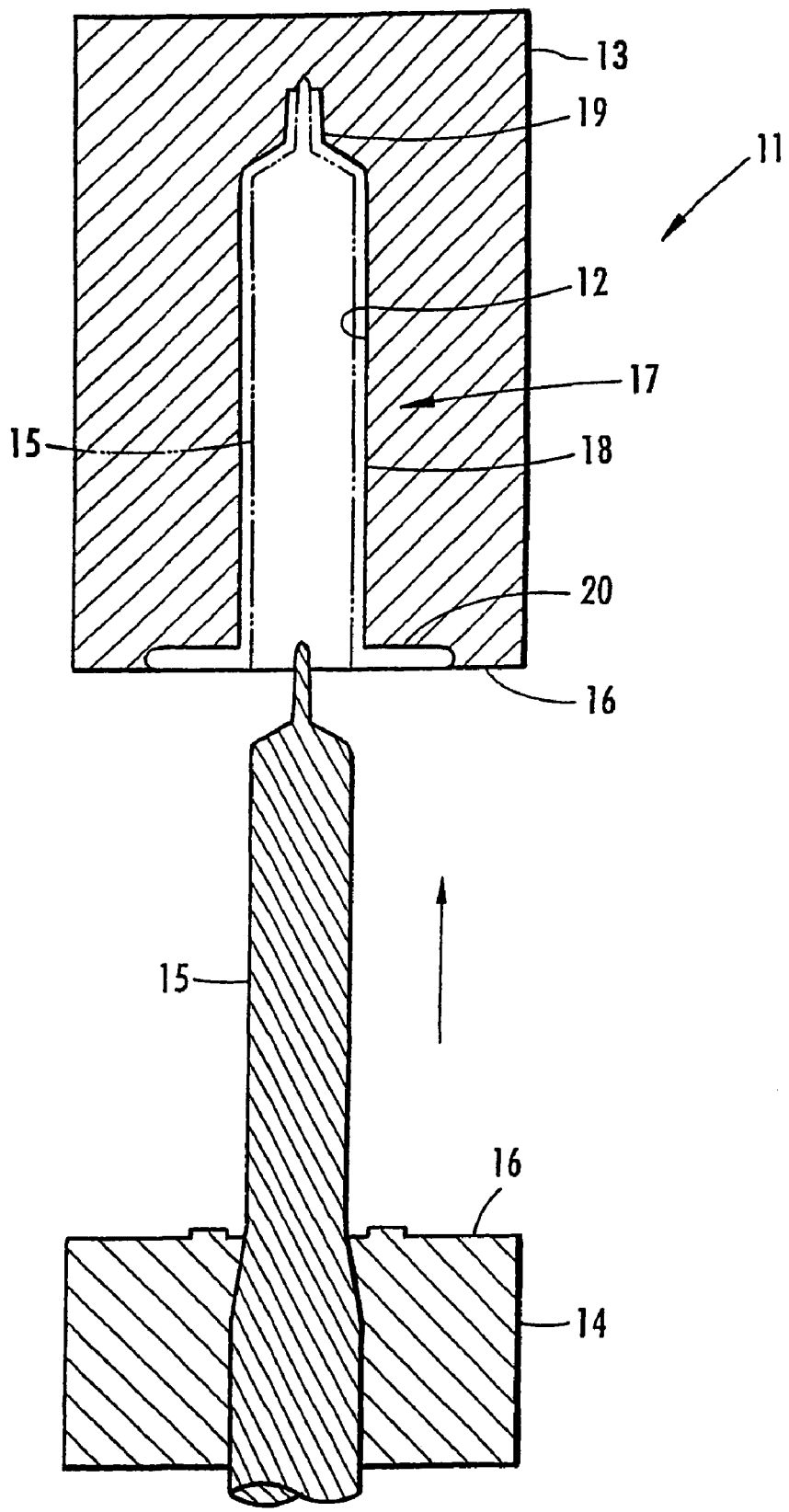
FIG. 6 is a cross sectional view explaining a conventional manufacturing method.
Figure 7:
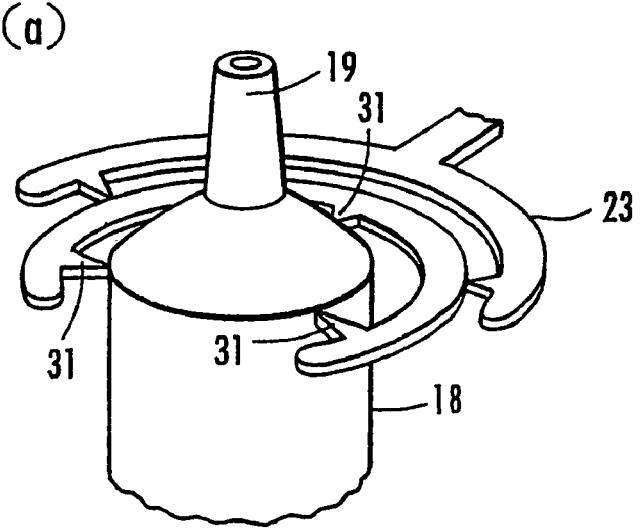
FIG. 7 is a perspective view showing gate arrangement in the conventional manufacturing method.
Figure 7:
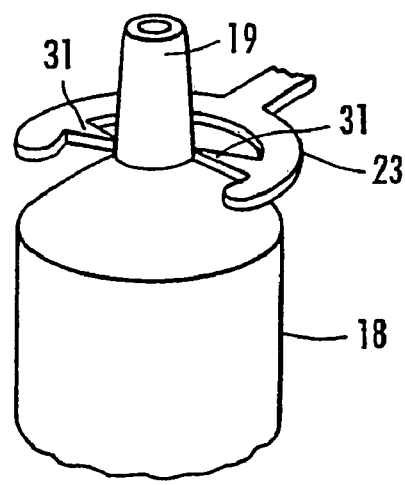
Figure 7:
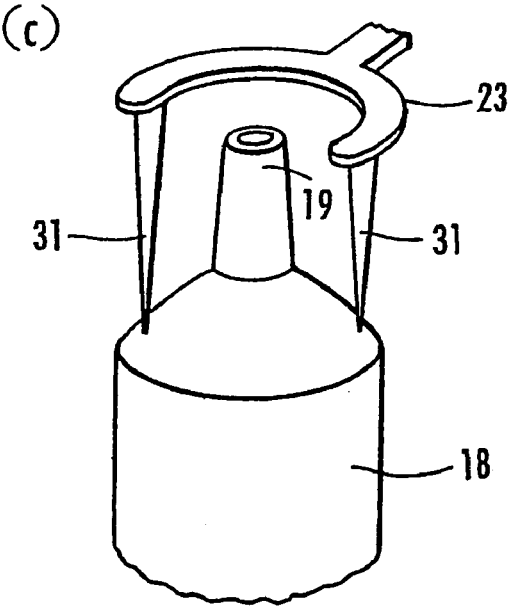
Figure 8:
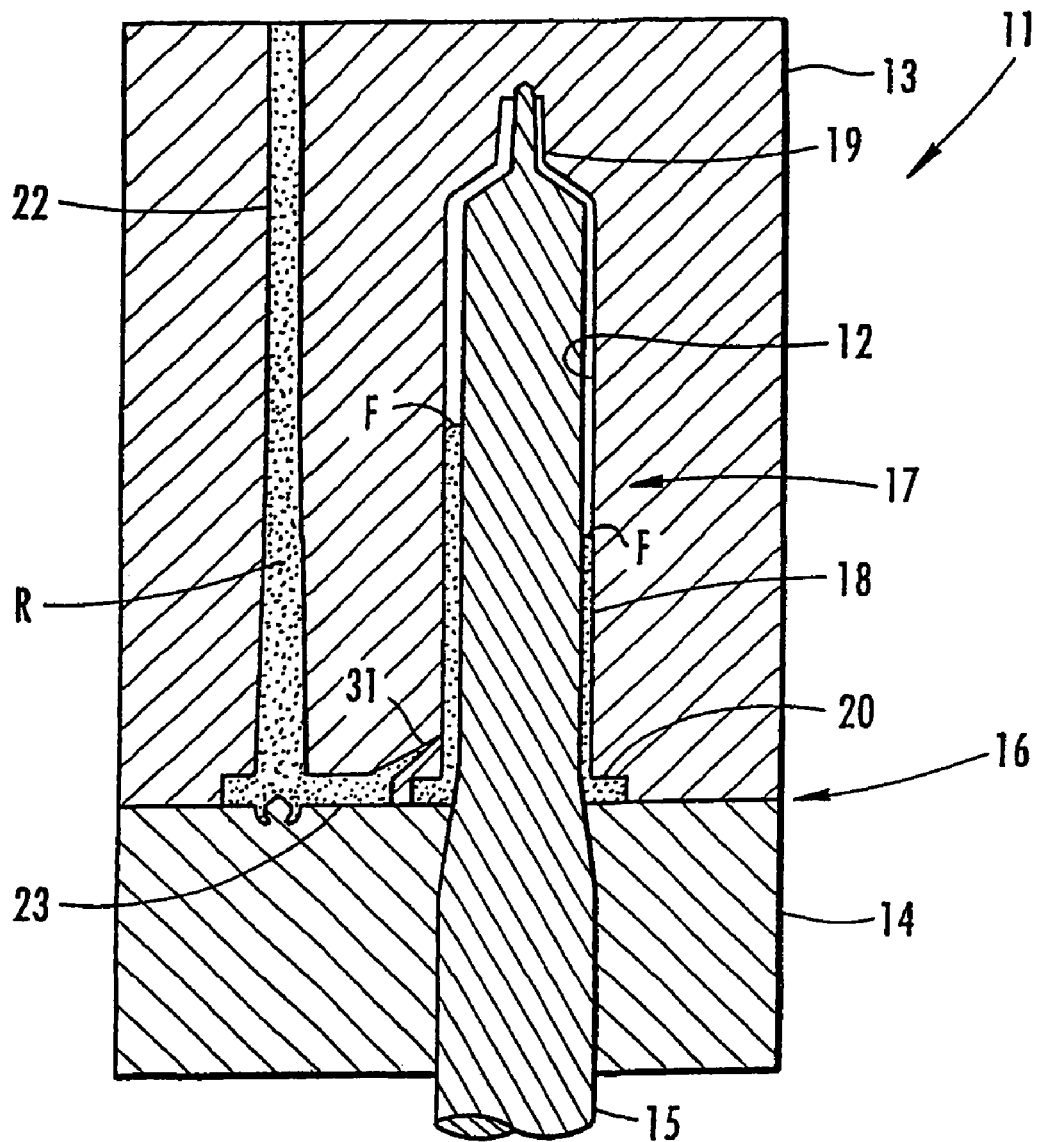
FIG. 8 is a cross sectional view explaining another gate arrangement in the conventional manufacturing method.
Figure 9:
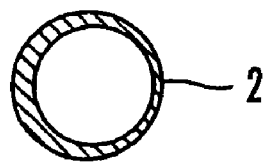
FIG. 9 is a cross sectional view explaining a barrel portion of the injector outer tube obtained by the conventional manufacturing method.

Moreover, as shown in FIG. 5, the metal mold 11 may have the fixed mold 13 having a plurality of hole portions 12; the movable mold 14 having a plurality of cylindrical vacant portions 21 communicating with the flange forming portions 20 of the respective hole portions 12; and a plurality of core pins 15 to be inserted into the respective holes 112, thereby forming a plurality of cavities 17. In this case, the movable mold 14 has a plurality of submarine gates 24 connected to the intermediate portion of the respective cylindrical vacant portions 21. Moreover, the fixed mold 11 has the sprue 22 for introducing the molten resin R and a plurality of runners 23 branching from the sprue 22 to communicate with the respective submarine gates 24.

The molten resin R is injected from the sprue 22 via the runners 23 and the submarine gates 24 into the respective cylindrical vacant portions 21 and into the cavities 17, thereby simultaneously obtaining a plurality of injector outer tubes 1.

In the metal mold for simultaneously producing a plurality of injector outer tubes 1, there is a case that the molten resin R is insufficient in a particular cavity 17 among the plurality of cavities. To cope with this, in the manufacturing method according to the present embodiment, for the cavity where the molten resin R becomes insufficient, the wait position of the push pin 25 is modified apart from the connection portion of the submarine gate 24 when performing injection of the molten resin R. Thus, for the amount of retreat of the wait position of the push pin 25 with respect to the fixed mold 13, the more molten resin R is introduced into the cylindrical vacant portion 21. Accordingly, when the push pin 25 is made to proceed toward the fixed mold 13 to reach the parting line, the amount of the resin introduced with pressure into the cavity 17 is increased, thereby compensating the insufficient resin in that cavity. It should be noted that the cavity 17 where the molten resin R becomes insufficient can be experimentally known after production of the metal mold 11 and actually performing an injection molding of the injector outer tube 1.

It should be noted that FIG. 5 shows the metal mold 11 having two cavities 17 arranged at right and left of the sprue 22 but the number of cavities may be more than two. In this case, a plurality of cavities may be provided radially around the sprue 22.

Next, an example will be detailed.

EXAMPLE

In this example, as shown in FIG. 2A, by using the metal mold 11 having one hole portion 12 and one core pin 15, an injector outer tube of 1 having a barrel portion 2 of about 70 mm, of nominal size 5 mL, was produced. In the movable mold 14 of the metal mold 11, the cylindrical vacant portion had a diameter 3 mm and a length 5 mm.

In this example, by using motor injection apparatus (not depicted), polypropylene of melt flow index (MFI) 20 to 30 at the cylinder temperature of 180 to 230° was injected from the sprue 22 via the runner 23, the submarine gate 24 into the cylindrical vacant portion 21 and into the cavity 17. In the apparatus of FIG. 2A, the sprue 22 is fairly long and there is a fear of increase of pressure loss of the molten resin R flowing. However, this increase of the pressure loss can be prevented by providing a long nozzle in the injector apparatus or providing heating means in the fixed mold 13 to obtain a hot sprue.

Moreover, the push pin 25 was operated by controlling the injection delay between 0.2 to 2 seconds while monitoring the injection time by the pre-ejector function of the motor injection apparatus.

As a result, it was possible to obtain an injector outer tube 1 having a preferable outer view at barrel portion 2 and the lure-taper portion 3. The injector outer tube obtained in this example was evaluated by a circularity measurement apparatus and it was found that as compared to a conventional injector outer tube, the circularity was high and the cylindricality was preferable. Moreover, the injection trace was almost identical to an injection trace of a push pin used in an ordinary injection molding. There was no cloudiness or gate refuse and it was possible to form a smooth surface of the flange portion 4 opposite to the barrel portion.

It should be noted that in this example, the injector outer tube 1 was molded by polypropylene. However, when a further transparency and resistance for high temperature sterilization are required, it is possible to mold by using a synthetic resin such as polycarbonate and polymethylpentene (TPX).

Moreover, instead of the submarine gate 24 opening to the cylindrical vacant portion 21 in this example, it is possible to use a submarine gate opening to the side surface of the flange forming portion 20 or a pin gate opening to the side of the barrel forming portion 18 of the flange forming portion 20. However, the flange portion 4 should satisfy the standard of the thickness and shape for suppressing rolling and capability to be connected to a syringe pump. The thickness should be below 3 mm or not greater than 3.5 mm as is defined by ISO7886-2 "Sterile hypodermic syringes for single use Part 2". Which of the aforementioned thickness is employed is determined by the size of the injector. For example, for the injector of nominal size of 5 mL in this example, the thickness of the flange portion should be below 3 mm.

As a result, when forming the flange portion of the aforementioned thickness, it becomes difficult from the metal mold structure to employ the submarine gate opening to the side surface of the flange forming portion 20 or the pin gate opening to the side of the barrel forming portion 20 of the flange forming portion 20.

Moreover, when employing the side gate for introducing the molten resin R from the side surface of the flange forming portion 18, the runner should be cut off from the metal molded injector outer tube at a later step. In the case of a U-shape arranged banana gate for introducing the molten resin R from the side of the movable mold 14 of the flange forming portion 18, the gate burr often remains and the gate cutting surface is not preferable.

INDUSTRIAL APPLICABILITY

The present invention can be used for a disposable injector used as a medical instrument.

What is claimed is:

1. An apparatus for manufacturing an outer tube of an injector, comprising:

an injection means for injecting a molten resin into a cavity defined by a metal mold comprising: a fixed mold having a hole portion having a shape along an outer shape of the injector outer tube consisting of a barrel portion, a taper portion arranged at a front end of the barrel where an injection needle is mounted, and a flange portion arranged at a rear end of the barrel, the fixed mold being provided vertical to a parting line defined by a rear end of the flange portion forming portion; a movable mold for closing the hole portion along the parting line; and a core piercing the movable mold and inserted into the hole portion;

wherein the fixed mold includes a sprue for guiding the molten resin and a runner branching from the sprue;

the movable mold includes a cylindrical vacant portion arranged vertical to the parting line and communicating with a portion where the flange portion is formed, and a submarine gate communicating with the runner and connected to an intermediate portion of the cylindrical vacant portion;

the injection means injects the molten resin from the sprue via the runner and the submarine gate into the cylindrical vacant portion; and the apparatus comprising: an introduction means for introducing the molten resin from the cylindrical vacant portion via the cylindrical vacant portion into the cavity.

2. The apparatus according to claim 1, wherein the metal mold includes a push pin provided slidably along an inner wall of the cylindrical vacant portion and having a tip end which can proceed up to the parting line;

the injection means injects the molten resin when the push pin is waiting at a predetermined wait position which is at opposite side of the fixed mold with respect to a connection portion of the submarine gate; and when the molten resin has become half-molten state, the introduction means makes the push pin to proceed up to the parting line so as to introduce the molten resin with pressure from the cylindrical vacant portion into the cavity.

3. The apparatus according to claim 2, wherein when the molten resin has become insufficient in the cavity, the introduction means modifies the wait position of the push pin in a direction apart from the connection portion of the submarine gate, so as to inject the molten resin, thereby compensating the insufficient resin in the cavity.

4. The apparatus according to claim 1, wherein the metal mold has: a plurality of hole portions provided in the fixed mold; a plurality of cylindrical vacant portions provided in the movable mold closing the respective hole portions along the parting line and communicating with portions where the flange portions of the respective hole portions are formed; and a plurality of cavities defined by the cores piercing the movable molds and are introduced into the respective hole portions;

the fixed mold has a sprue for guiding the molten resin and a plurality of runners branching from the sprue;

the movable mold has a plurality of submarine gates communicating with the respective runners and connected to an intermediate portion of the respective cylindrical vacant portions;

the injection means injects the molten resin from the sprue via the runners and the submarine gates into the respective cylindrical vacant portions; and the introduction means introduces the molten resin from the cylindrical vacant portions via the cylindrical vacant portions into the respective cavities.

5. The apparatus according to claim 1, wherein the injection means injects as molten resin, one resin selected from a group consisting of polypropylene, polycarbonate, and polymethylpentene.

* * * * *